United States Patent Office 3,446,076
Patented May 27, 1969

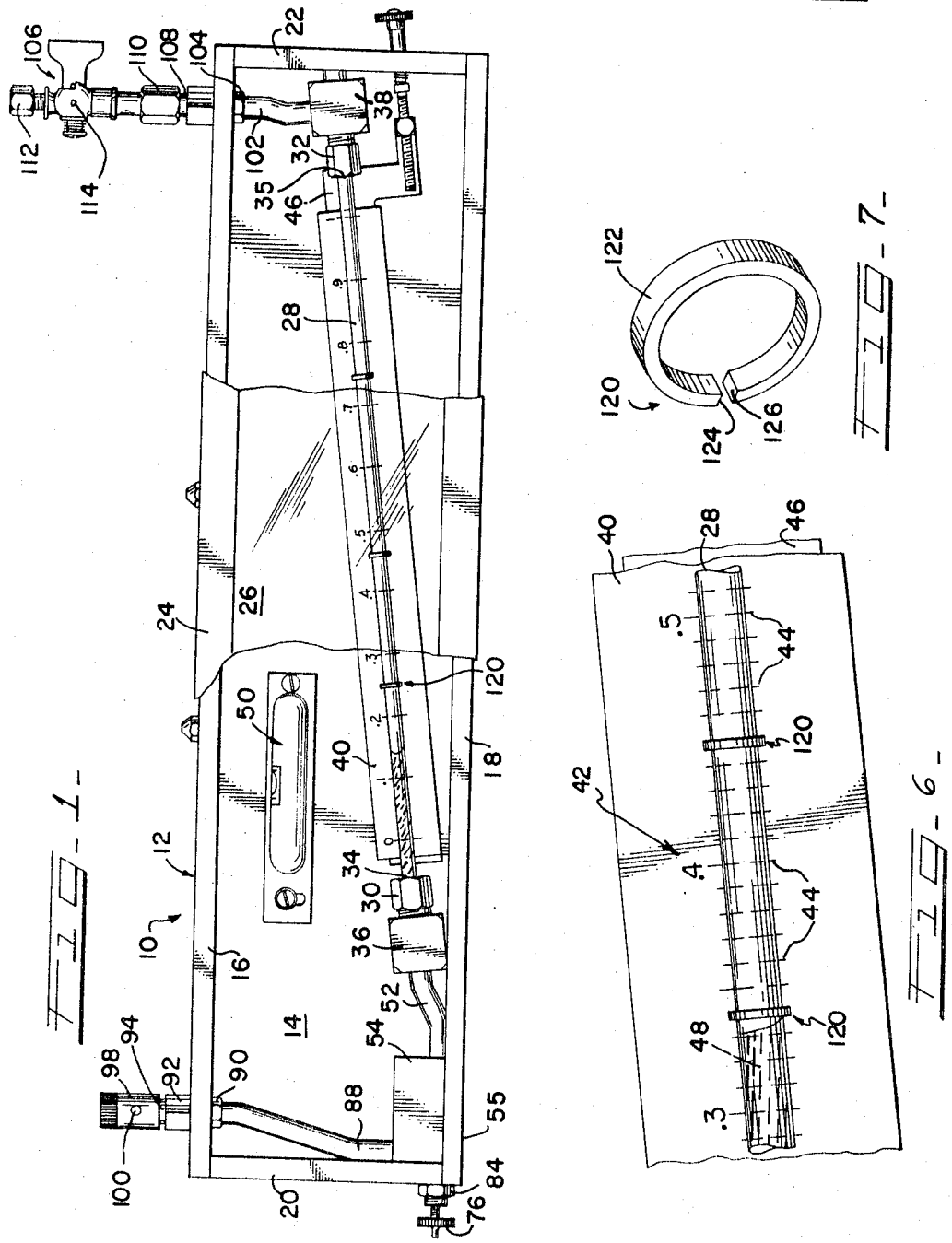

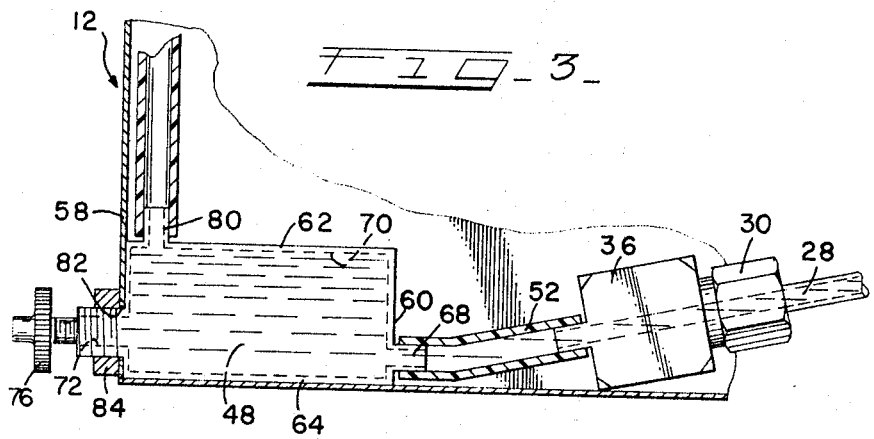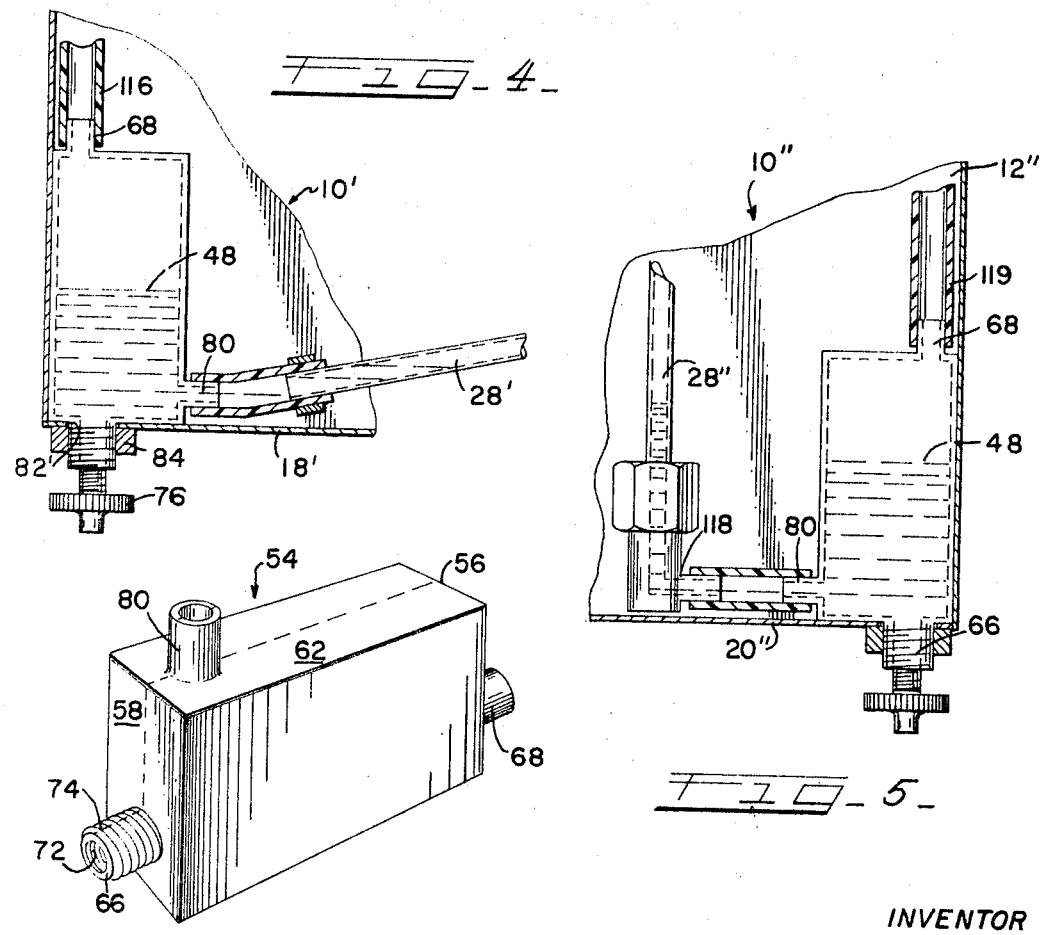

3,446,076
MANOMETRIC GAUGES
Peter Douglas Dieterich, Michigan City, Ind., assignor to Dieterich Standard Corporation, Michigan City, Ind., a corporation of Indiana
Filed Apr. 3, 1967, Ser. No. 628,113
Int. Cl. G01l 7/18
U.S. Cl. 73—401
6 Claims

ABSTRACT OF THE DISCLOSURE

Improvements in manometric gauges are provided, namely a universal fluid reservoir and simplified indicating means; the universal fluid reservoir being formed as a hollow rectangular body of polyamide plastic (nylon) having communicating conduits extending outward therefrom on a pair of opposed short sides and one of the opposed long sides of the body; the distances from the centers of each of the conduits to the closest adjacent corner of the body being identical: the simplified indicating means comprising at least one resilient C-snap ring of plastic material engaged directly upon the indicating tube of the gauge and movable therealong at will to mark limits to facilitate visual monitoring of the gauge.

This invention relates generally to manometric gauges and more particularly, concerns improvements in manometric gauges which facilitate the use and economy of manufacture of such gauges by providing a universally adaptable fluid reservoir therefor and by providing simplified indicating means for the visual monitoring of said gauges between predetermined limits.

Manometric gauges for measuring of pressures by observation of the level of fluid in a tube by reference to a predetermined graduated scale are well known in the art. Such familiar gauges may comprise U-tubes, one end of which is connected to a reservoir of fluid, such as oil or mercury, while the other end is open and connected to the system the air pressure of which is to be observed. Other manometric gauges, such as draft gauges, may be utilized in connection with steam boiler furnaces for indicating the pressures which obtain in different parts of the boiler or the difference between these pressures together with the effective pressure in one of the parts or in a third part. These draft gauges may be of the inclined indicating tube form or may comprise a vertically arranged indicating tube. All are provided with a reservoir for containing the measuring fluid and generally all are provided with indicators movable along a scale and settable along said scale at predetermined locations.

Previous reservoirs are mounted to the back of the instrument case or to the bottom of the case. Commonly, for each different type of gauge, a different reservoir had to be constructed. Each type of gauge required different placement of the reservoir relative to the case and the tube interior of the case. Often, the means for draining the reservoir were separate and apart from the means for mounting the reservoir to the case, necessitating a plurality of openings formed in said case, at added expense and inconvenience. Standardization of the cases was limited, although desired. Some previous reservoir constructions which were intended for plural manometer usage application were, at most, limited to a maximum of two applications. Previous reservoir constructions rendered difficult and expensive the desirable flush panel mounting of the instruments. Often, for flush panel mounting, additional chambers would have to be provided at added expense and greater inconvenience. In prior reservoir constructions, internal dimensions were difficult to control, particularly with smaller reservoir chambers. In fact, the miniaturization of the chamber was limited even though a smaller chamber would enable better control and accuracy of the instrument.

Prior indicating means generally comprised clamp-like devices such as those utilizing locking screws and other similar means for positioning an indicating member selectively along a scale. Such "marker" means were attached to the scale plate, thereby covering numbers or increment lines of the scales. This caused difficulties in reading and/or setting the "markers." Prior indicating means were adjustable along the length of the scale but their movement was interfered with by contact with obstacles, such as the scale mounting screws. Often, the prior indicating means would scratch the indicating scale in the course of frequent use, and were often difficult to repair and/or replace. In addition, prior constructions of indicating means limited the distance between settings due to the relatively large size of the prior indicating means, thereby preventing indicating of close spaced maximum-minimum points on the scale. Also, prior indicating means could not be easily removed from the scale area during periods of non-use; were expensive to fabricate, and thus increased the cost of the gauges appreciably.

Accordingly, it is the principal object of this invention to provide an improved reservoir construction for use in manometric gauges wherewith the above enumerated disadvantages of prior reservoirs are eliminated and the reservoir is truly universal in application to such gauges.

Another object of this invention is to provide improved and simplified indicating means for manometric gauges which likewise eliminates the disadvantages of prior devices, and, along with the universal type reservoir, serves to provide a manometric gauge of improved quality, lower manufacturing cost, increased accuracy, convenience of use and unusual versatility.

A further object of this invention is to provide a manometric gauge in which the fluid reservoir is formed of a molded plastic material chemically inert to the measuring fluid, said reservoir having ports selectively located in the side walls thereof to permit orientation in a variety of positions relative the instrument casing so as to be capable for use with many different types of gauges, and contribute to the standardization of the instrument casings therefor.

A still other object of this invention is to provide a fluid reservoir for manometric gauges which combines the means for mounting the same to the instrument casing with drain means for the reservoir, so as to permit the openings in the casing to be held at a minimum to reduce manufacturing cost thereof, and as well appreciably reducing the total manufacturing cost of the instrument.

Another object of this invention is to provide an improved reservoir construction for manometric gauges which is capable of truly universal application to accommodate different types of gauges.

Yet another object fo this invention is to provide a manometric gauge having a fluid reservoir where so constructed as to facilitate flush panel mounting of the instrument.

An important object of this invention is the provision of simplified indicating means for manometric gauges comprising at least one resilient C-snap ring formed of plastic material and attachable directly to the manometer indicating tubing for slidable movement therealong.

Other objects and advantages of the improvements according to the invention will be evident to one skilled in this art as a detailed description of a preferred embodiment thereof follows hereinafter, with reference to the accompanying drawings.

In the drawings:

FIG. 1 is a front elevational view of a draft gauge embodying the improvements according to the invention therein, portions of which are broken away to show interior construction.

FIG. 2 is a perspective view of the universal fluid reservoir embodying the invention.

FIGS. 3, 4 and 5 are enlarged sectional views of the fluid reservoir according to the invention as employed in gauges of different purpose showing the different positions of mounting thereof in the cases of such instruments.

FIG. 6 is an enlarged fragmentary view of a manometric tube and scale therefor, the simplified indicating means according to the invention being mounted therealong.

FIG. 7 is an enlarged perspective view of one of the C-snap rings of the simplified indicating means embodying the invention.

The improvements in manometric gauges according to the invention are illustrated by way of example as employed in an inclined tube draft gauge of the type shown in FIG. 1. The draft gauge is designated generally by reference character 10 and comprises a housing or casing 12 of rectangular configuration having a rear wall 14, top and bottom walls 16, 18, opposite side walls 20, 22 and a removable front wall 24 carrying a viewing window 26. The gauge proper consists of a tube 28 disposed inclined along the interior of rear wall 14 of the casing 12 and inclined horizontally along said rear wall. Coupling means 30 and 32 are disposed at opposite ends 34, 35 of said tube to join a pair of hollow air tight chambers 36 and 38 communicatively to said tube. Behind the tube 28 is a scale plate 40 having predetermined scale delineations printed or otherwise inscribed thereupon, said scale 42 consisting of graduated markings 44 indicating a range of pressure readings.

The scale plate 40 is mounted upon a movable plate 46 which is secured to the rear wall 14 of the casing 12. The plate 46 is movable to a limited extent between certain limits, say 4 mm., so as to permit fine setting of the zero poin of the scale 42 with the position of the meniscus of mobile fluid 48 adapted to travel through the tube 28 so that the pressures may be indicated. A simple spirit level 50 is provided to properly determine the installation position of the gauge 10.

The indicating tube 28 communicates through the coupling 30 and chamber 36 by way of a length of plastic tubing 52 to a fluid reservoir, generally indicated by reference character 54, secured in one corner 55 of the casing 12. One improvement according to the invention resides in the structure and configuration of the fluid reservoir 54. The reservoir 54 has a hollow body 56 formed of plastic material, preferably of nylon which is chemically inert to most indicating fluids utilized in the gauges. The body 56 has a pair of opposed short sides 58, 60 and a pair of opposed long sides, 62, 64. Conduit members 66 and 68 communicate to the interior of the chamber 70 formed interior of body 56 through the opposite short sides 58 and 60 respectively and extend outward thereof with their respecive axes aligned and arranged perpendicular to the respective sides 58, 60. Conduit 66 is provided with screw threads 72, 74 both on the interior and exterior surfaces thereof. A screw threaded drain plug 76 is removably fitted on the open end 78 of said conduit 66. A third conduit 80 is formed in body 56 to communicate to the interior of the chamber 70 but is formed through one, 62, of the long sides 62, 64 extending outward therefrom, the axis of the conduit 80 being said side 62.

In the arrangement shown illustrated in FIG. 1, fluid reservoir 54 is mounted within the casing 12 with long side 64 resting flat upon the bottom wall 18 of the casing 12 and conduit 66 extending through the side wall 20 of the casing 12, passing through a preformed opening 82 formed therein. The side wall 58 of body 56 abuts the inner surface of wall 20 and hence the position of the installed reservoir is stable. A nut 84 is mounted on the exterior threaded surface 74 of said conduit 66 and tightened to secure the reservoir 54 immovably in position in the casing 12.

A threaded plug 76 is engaged in the open end 78 of the conduit 66 to serve as drain means for the reservoir. Thus, the mounting means and drain means for the reservoir are combined into a single structure requiring only a single opening to be formed in the wall of the casing.

The conduit 80 extending from the long side wall 62 of the reservoir is joined by a length 88 of flexible tubing to a hollow fitting 90 which passes through the top wall 16 of casing 12. Hollow fitting 90 is provided with a hexagonal base portion 92 and an extension 94. The extension 94 has an exterior threaded surface (not shown) adapted to be engaged by a cap 98 which is provided a pair of opposed breather openings 100 so as to provide communication with the atmosphere.

The chamber 38 at the uppermost end 36 of the indicating tube 28 is connected by means of a length 102 of flexible tubing to a hollow fitting 104 substantially identical to fitting 90. A valve 106 is provided adapted to be coupled to the threaded end 108 of fitting 104 by coupling means 110. One end 112 of the valve 106 is adapted to be coupled to a pipe (not shown) leading from the flue of the furnace (not shown). The valve 106 is provided with an air vent 114.

The reservoir 54 according to the invention may be formed of a pair of half sections joined longitudinally through the body 56 of said reservoir. These half sections may be molded of fluid resistant material such as the polyamides like nylon so that each cavity thereof is kept to precise tolerances in dimensions. The half sections then may be fused together with the cavities of each combining to form the interior chamber 70. (Dotted lines, FIG. 2.)

The location of the conduits is chosen carefully so that the distance from the closest adjacent corner is the same for each of the conduits, i.e., taken from the center of each conduit to the intersecting planes of said side walls forming the closest adjacent corner of the body 56. Instead of the conduits formed with the body, ports located similarly may be provided communicating with the interior chamber 70 and other, separate conduit means connected to such parts.

In FIG. 3, the reservoir according to the invention is illustrated in the position assumed in the draft gauge of FIG. 1, with the reservoir oriented horizontally.

In FIG. 4, the reservoir 54 is shown employed in a different gauge 10' wherein the reservoir 54 assumes a vertically oriented position with the combined drain and mounting means disposed through an opening 82' formed in the bottom wall 18' of the instrument casing 12' and conduit 80 which, in the arrangement of FIGS. 1 and 1–3, communicates with the fitting leading to the atmosphere, instead now communicates by means of the length 116 of tubing to the indicating tube 28'. The conduit 68, which in the draft gauge 10 of FIGS. 1–3, communicated with the indicating tube, now is joined by the length 116 of flexible tubing to that fitting (not shown) which communicates with the atmosphere.

In FIG. 5, the reservoir 54 is shown installed in a vertical draft gauge 10". The casing 12" may be identical to that used to house gauge 10. The wall of the casing 12" which formerly was the side wall 20 of the casing 12 of FIG. 1, now functions as the bottom wall 20". The reservoir 54 again is vertically oriented, but in this instance, both casing and reservoir are oriented 90° from the position thereof in FIGS. 1–3. The conduit 80 which formerly functioned to communicate with the atmosphere, now is joined directly to fitting 118, which, in turn, is secured to the indicating tube 28" now vertically oriented instead of being inclined. The conduit 68 now communicates, via length 119 of flexible tubing with a fitting (not shown) which leads to the atmosphere.

In prior gauges, such versatility was unavailable. Here, the reservoir 54, according to the invention, can be firmly seated against movement within the confines of the casing simply by a single coupling means, instead of being disposed exterior of the casing and/or requiring special brackets and additional openings in the casing. Also, flush panel mounting of the gauges is made possible without a special fitting or extra couplings.

Attention is now directed to FIGS. 6 and 7 wherein the improved simplified indicating means according to the invention are shown installed in FIG. 6 and separately in FIG. 7.

The simplified indicating means of the invention are designated generally by reference character 120 and comprise at least one resilient C-snap ring 122 formed of plastic material and preferably of the order of 1/16 to 1/8 inch in thickness. Simple conventional plastic tubing, generally about 1/4 inch in diameter, is sliced along a plane perpendicular to its axis to the desired thickness. The inner diameter of the ring generally is selected to be less than the diameter of the indicating tube so that the frictional engagement between tube and ring will be secure against non-intended movements. A section is severed from the slice to define the spaced ends 124 and 126. Generally, a plurality of rings 122 perhaps of differing colors may be utilized in any single gauge. They may be moved easily along the tube. They do not encounter any obstructions, since no fastening means or brackets and the like are required as in the past to mount any indicating means which have been provided. The indicating scale is neither obstructed nor marred by the repeated movement of the rings. The minimal thickness of the rings 122 make possible settings of maximum-minimum limits much closer together along the scale. Further, the fact that the ring follows the circumference of the tube enables clearer reading of the gauge by visual observation. Also, the ease of mobility of said rings make possible the use of less than the actual number provided by simply moving those not required off to one end of the tube, off scale. Even removal from the tube easily is in order. Because of their resilience the stability of the rings 122 at their set location is satisfactory without need for set screws or other fastening or locking means.

Although by way of example, the improvements provided by the invention herein was shown and described as embodied in an inclined tube draft gauge, the said improvements as easily and advantageously may be employed in velocity gauges, vertical and U-tube draft gauges, air filter gauges and multiple tube gauges as well as many other manometric instruments for industrial, medical, analytical and educational usages.

Many of the details of the construction above described are capable of being varied without in any way departing from the spirit and scope of the invention.

What it is desired to be secured by Letters Patent of the United States is:

1. Improvements in manometric gauges which include an indicating tube one end of which is connected to a fluid reservoir and the other end of which is connected ultimately to a conduit communicating with an area the pressure in which is to be monitored, the reservoir having a drain, a connection to the atmosphere and a connection to the indicating tube, the indicating tube arranged in a casing and a graduated scale means arranged along the length of the tube; the improvement which comprises the reservoir being formed as an integral hollow rectangular body having pairs of opposite short and long side walls, first and second ports formed in the opposite short side walls of said body and communicating interior of the body, a third port formed in only one of the opposite long side walls, the other one of said long side walls being imperforate, said ports each being spaced equally distant from the closest adjacent corner of said body whereby said reservoir is capable of being varied in orientation and thus be capable of use with different types of manomertic gauges, the respective ports being always in correct position for connection to the other manometer components.

2. The improvement as claimed in claim 1 in which a hollow conduit extends from said first port, said conduit having inner and outer threaded surfaces, said conduit adapted to be passed through one wall of the casing and carrying means on the outer threaded surface thereof for securing same immovably to the casing, and plug means removably secured over the open end of said conduit for draining said reservoir.

3. The improvement as claimed in claim 1 and removable indicating means comprising at least one resilitent C snap ring engaged directly to the indicating tubing for marking limits along the scale means to facilitate visual monitoring of the gauge.

4. In a manometric gauge which includes a hollow, open-ended indicating tube one end of which is connected to a fluid reservoir and the other end of which is connected ultimately to a conduit communicating with an area the pressure in which is to be monitored, the fluid reservoir having a drain, a connection to the atmosphere and a connection to the indicating tube, the indicating tube arranged in a casing and a graduated scale means arranged along the length of the tube; the invention comprising the fluid reservoir being formed as an integral hollow rectangular body having pairs of opposite long and short side walls, first and second ports formed in the opposite short side walls of said body communicating interior of the body, a third port formed in only one of the opposite long side walls, the other one of said long side walls being imperforate, said ports each being spaced equidistant from the closest adjacent corner of said rectangular body whereby said reservoir is capable of being varied in orientation for use with different types of manometric gauges, the respective ports being always in correct orientation for connection to the other manometer components, one of said ports carrying a conduit extending therefrom, coupling means arranged on said conduit for securing the reservoir to the casing with the conduit passing through a preformed opening in the casing wall and plug means in the free end of said conduit selectively removable for draining of said reservoir when desired.

5. The structure as claimed in claim 4 in which at least one resilient C ring of plastic material is engaged directly on the circumferential surface for indicating limits for visual monitoring of said gauge between predetermined limits demarked by said ring, said ring having a section thereof removed to define a pair of facing free ends adapted to be spread for effecting said engagement, the diameter of said ring being less than the diameter of the indicating tube to effect a secure frictional engagement therewith yet said ring being movable along said tube for location at any selected position therealong.

6. In combination, limit indicating means and a manometric gauge, wherein the gauge includes a plate having a face surface, a graduated scale carried on the face surface, an opposite ended indicating tube arranged mounted in close proximity to the face surface and along the length of the scale over the face and scale and a fluid having a meniscus movable within the tube, fluid retaining means at opposite ends of said tube closing off access to that portion of the tube between said ends and coextensive with the scale from a direction over said tube ends and the plate closing off access to that tube potrion from other than facewise direction relative the tube; and said limit indicating means comprising at least one split ring member of C shaped configuration of resilient plasticized material, said ring member having a pair of opposite free ends spaced apart and spreadable for engagement facewise directly onto the tube between the ends thereof, the resilience of said ring being sufficient to self return said spread ends to their normal condition tightly engaging the tube, said split ring member being movable frictionally along the length of the tube to be located at any selected position along the scale and selectively removable from the tube in the same manner as installed thereon.

References Cited

UNITED STATES PATENTS

| | | | |
|---|---|---|---|
| 1,258,426 | 3/1918 | Mackintosh. | |
| 41,549 | 2/1864 | Thomson | 73—385 |
| 127,752 | 6/1872 | Emery et al. | 73—385 |
| 394,974 | 12/1888 | Guss | 73—401 |
| 899,217 | 9/1908 | Hetherington. | |

LOUIS R. PRINCE, *Primary Examiner.*

D. O. WOODIEL, *Assistant Examiner.*